United States Patent [19]
Robbins

[11] Patent Number: 5,407,394
[45] Date of Patent: Apr. 18, 1995

[54] GUIDE FOR AN ADJUSTABLE PULLEY IN A CONTINUOUSLY VARIABLE TRANSMISSION

[75] Inventor: Francis B. Robbins, Dryden, N.Y.

[73] Assignee: Borg-Warner Automotive, Inc., Sterling Heights, Mich.

[21] Appl. No.: 58,552

[22] Filed: May 5, 1993

[51] Int. Cl.6 ............................................. F16H 61/00
[52] U.S. Cl. ........................................ 474/28; 474/30; 474/43
[58] Field of Search ................ 474/8, 18, 17, 28–30, 474/43–45

[56] References Cited

U.S. PATENT DOCUMENTS

| | | |
|---|---|---|
| 3,085,446 | 4/1963 | Erickson . |
| 3,117,461 | 1/1964 | Fermier . |
| 3,386,300 | 6/1968 | Maurey et al. .................. 474/44 |
| 3,393,572 | 7/1968 | Larsson . |
| 3,400,600 | 9/1968 | Ruprecht et al. . |
| 3,470,756 | 10/1969 | Ruprecht ......................... 474/39 |
| 3,504,560 | 4/1970 | Wunsch . |
| 3,636,785 | 1/1972 | Weindler et al. . |
| 3,757,594 | 9/1973 | Kumm . |
| 3,771,377 | 11/1973 | Bush . |
| 3,868,862 | 3/1975 | Bessette . |
| 4,023,425 | 5/1977 | Parker ............................ 474/28 X |
| 4,143,558 | 3/1979 | van Deursen et al. . |
| 4,259,874 | 4/1981 | Guirriec . |
| 4,350,491 | 9/1982 | Steuer . |
| 4,433,594 | 2/1984 | Smirl . |
| 4,575,364 | 3/1986 | Lamers . |
| 4,596,536 | 6/1986 | Okawa et al. . |
| 4,617,004 | 10/1986 | Mott . |
| 4,619,587 | 10/1986 | Linnig . |
| 4,628,746 | 12/1986 | van Rooij . |
| 4,838,835 | 6/1989 | Takano et al. . |
| 4,869,705 | 9/1989 | Fenton . |
| 5,006,092 | 4/1991 | Neuman et al. . |
| 5,013,283 | 5/1991 | d'Herripon . |
| 5,031,481 | 7/1991 | Algrain et al. ................... 474/8 X |

FOREIGN PATENT DOCUMENTS

| | | |
|---|---|---|
| 347388 | 6/1960 | Germany . |
| 907405 | 10/1962 | United Kingdom . |

*Primary Examiner*—Roger J. Schoeppel
*Attorney, Agent, or Firm*—Willian Brinks Hofer et al.; Greg Dziegielewski

[57] ABSTRACT

The present invention provides a radial drive connection between a movable flange and the shaft of an adjustable pulley. Specifically the movable flange is driven through the use of supports fixed to the shaft which radially fix the movable flange while allowing for axial movement. The supports are provided through a rigid disc splined to the shaft. The disc has an annular extension extending therefrom. Attached at one end to the disc and at the opposite end to the extension is at least one guide. Each guide is made from a bolt or pin and an annular sleeve. The movable flange is designed to have a foot which has an annular wall to it. Through this wall the movable flange slidably engages the guide and provides a radial drive connection. Because the wall and guide slide, however, the movable flange is permitted to move in the axial direction.

19 Claims, 5 Drawing Sheets

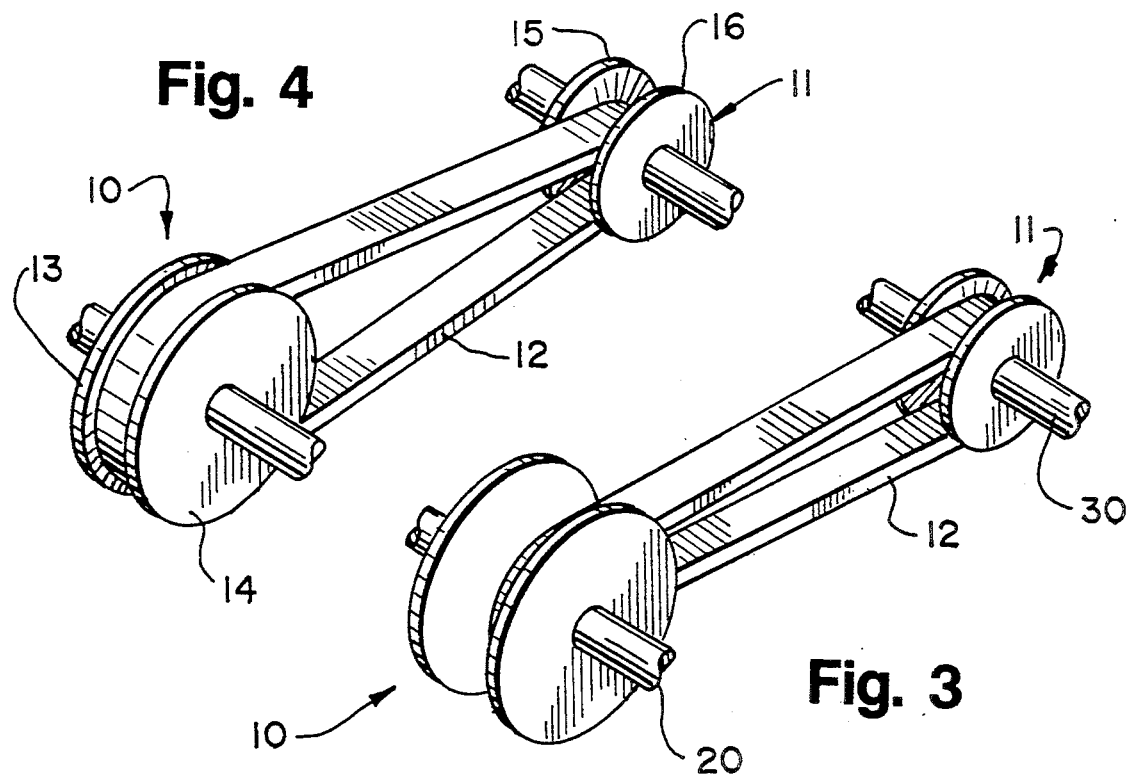
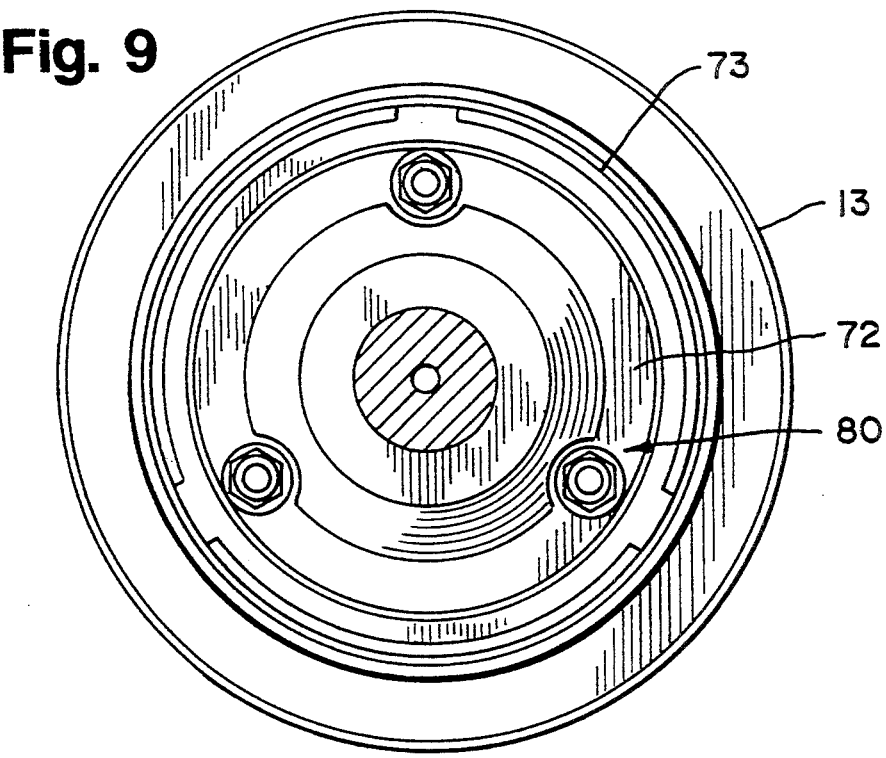

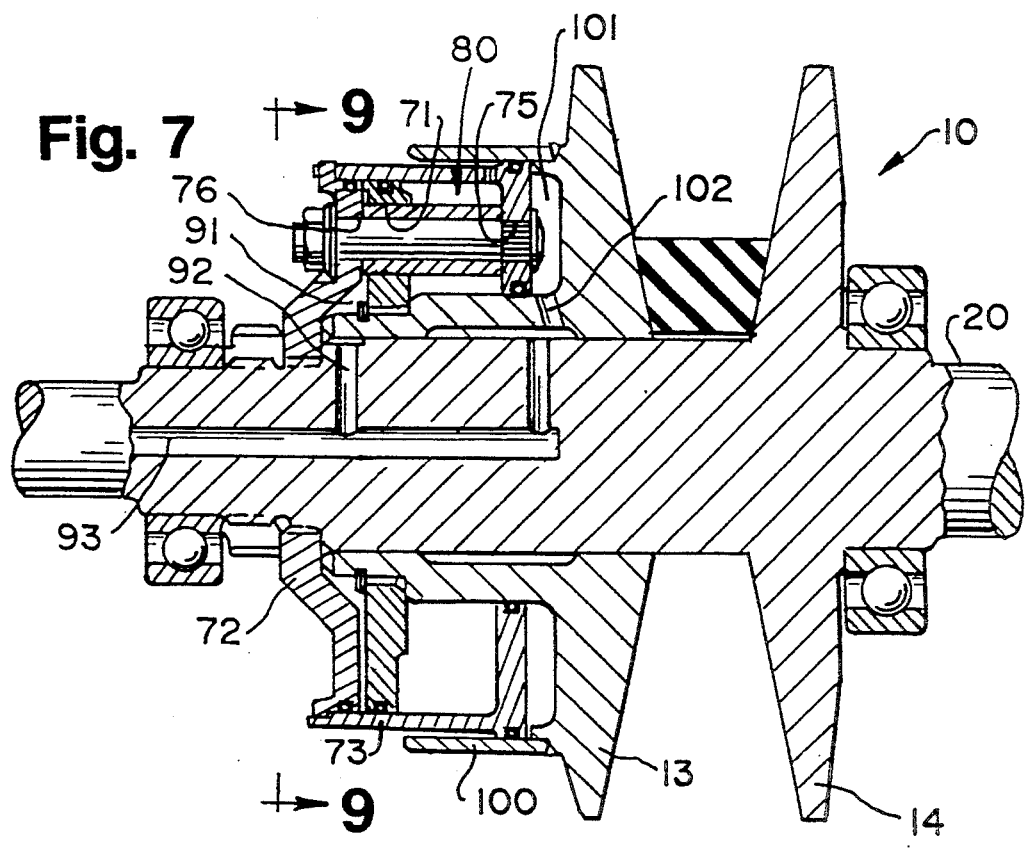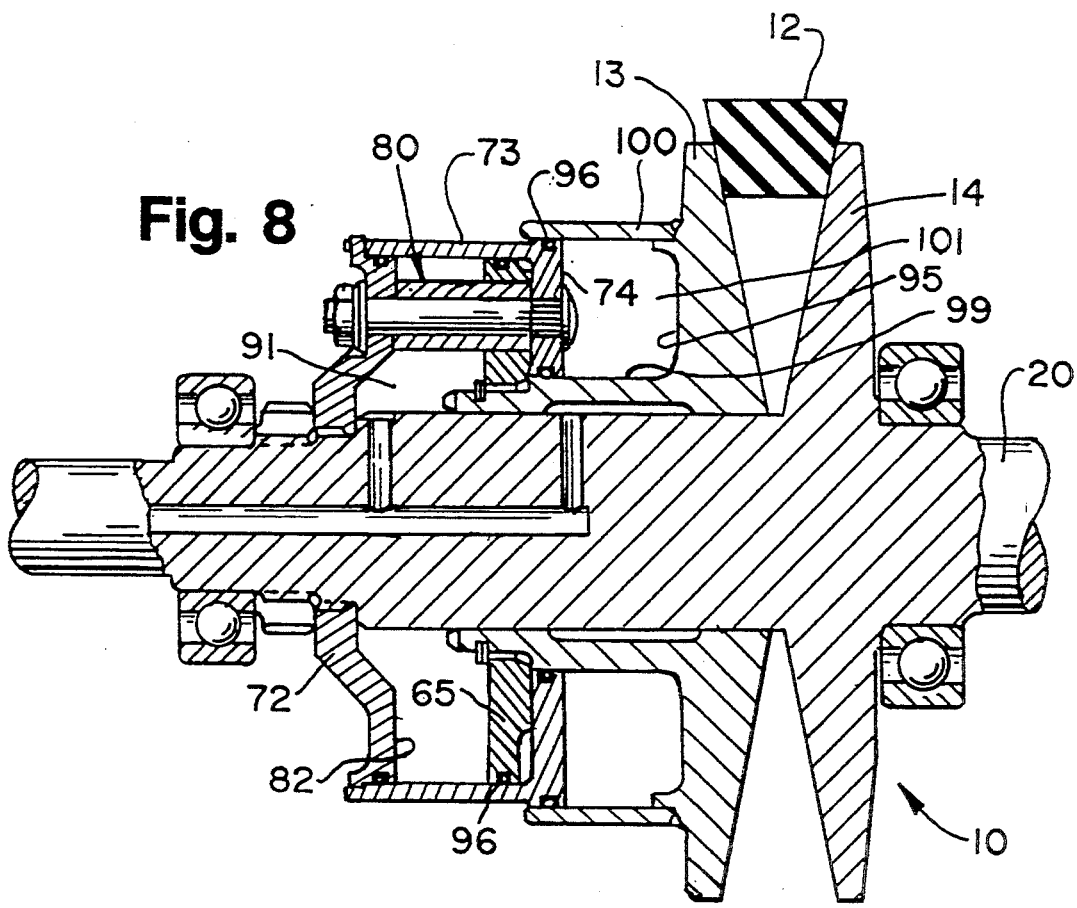

GUIDE FOR AN ADJUSTABLE PULLEY IN A CONTINUOUSLY VARIABLE TRANSMISSION

FIELD OF THE INVENTION

This invention relates to continuously variable transmissions, and more particularly to an adjustable pulley for such a transmission in which the pulley has a movable flange and the pulley shaft has a support structure to provide a drive connection between the movable flange and the shaft.

BACKGROUND OF THE INVENTION

Continuously variable transmissions ("CVTs"), generally utilize a pair of adjustable pulleys, typically defined as a primary pulley and a secondary pulley. The primary pulley is connected to an engine and the secondary pulley is connected to the drive train of the vehicle, typically through a clutch. One example of such a CVT is shown in Smirl, U.S. Pat. No. 4,433,594 entitled "Variable Pulley Transmission" and incorporated herein by reference.

Interconnecting the pulleys is a drive belt. Specifically the drive belt transfers power from the primary pulley to the secondary pulley, i.e., from the engine to the drive train, by means of frictional contact between the side faces of the drive belt and the contact faces of the pulleys. The side faces of the drive belt are shaped to correspond to the contact faces of the pulleys.

Each pulley is constructed from two flanges, each flange having a conical side surface which thereby defines a V-shaped gap between the flanges. At least one of the flanges is movable along the axis of the respective pulley shaft allowing the gap between the flanges to be varied. In such a fashion the transmission ratio of the CVT can be varied, i.e., changing the effective gap width between the flanges of the two pulleys varies the radial position of the drive belt in each pulley. This allows for a continuous adjustment of the drive ratio between the shafts.

Movement of the flanges is achieved through a hydraulic servo which moves the flange through a fluid constraining chamber. Increasing fluid pressure in the chamber axially moves the flange and thus increases the effective diameter of the pulley. As fluid pressure is exhausted from the chamber the flange moves along the shaft in the opposite direction, thus decreasing the effective diameter of the pulley. Generally the effective diameter of the primary pulley is moved in one direction as the effective diameter of the secondary pulley is moved in the other. A further and more detailed description of the movement of the flange may be found in Neuman et al. U.S. Pat. No. 5,006,092 entitled "Continuously Variable Transmission Power Train Configuration" and incorporated herein by reference.

The connection between the movable flange and the drive shaft allows the flange to move axially while being fixed radially. The prior art details several ways to accomplish such a connection. For example, an internal keyway may be provided in the respective shaft to receive a key fitting. The keyways, however, must be machined into the shaft and flange, an expensive procedure. During loading of the pulley, moreover, high forces are required to slide the movable flange axially along the keyway. Loading on the key, under these circumstances, can become excessive and may lead to premature failure of the transmission.

Another way to connect the movable flange to the shaft is through a ball-spline connection. In such a design a plurality of balls are used with mating grooves, the balls functioning as both anti-friction elements and to provide a drive connection between the flange and shaft. This type of connection is expensive to construct as it requires machining close tolerances between the balls and mating grooves of the shaft and the flange.

Instead of the above-described movable flange-shaft connections, Bessette, U.S. Pat. No. 3,868,862 entitled "Expansible Pulley With Speed And Torque Responsive Means" teaches the use of a pivotally connected link or links between the movable flange and the drive member. In one embodiment a single link is circumferentially arranged with respect to the flange and drive member, and in another embodiment, three spaced links are angularly arranged with respect to the flange and drive member. In both embodiments, the links must be rigid and must be provided with pivoting joints which, in the case of the second embodiment, are universal joints. To operate properly, these joints must be constantly lubricated. The link or links exert a force component to the pulley flange which either adds to or subtracts from the force applied by other means to the flange.

A support between a movable flange and a shaft is disclosed in d'Herripon, U.S. Pat. No. 5,013,283. This reference teaches the use of pin members carried by the movable flange and fixed between the movable flange and an inwardly bent edge of a cylinder mounted to the flange. The pin members extend through and are supported by a piston mounted on the shaft. This structure provides that the pin members take up the forces exerted by the belt close to their point of application so that the moveable sheave may be constructed less rigid and with smaller mass.

The known pulley designs heretofore used are believed to perform satisfactorily but nevertheless improvements are desirable. The flange-shaft drive connection should be accomplished in a low cost manner, e.g., requiring a minimum of machining of the shaft or flange or utilizing low cost, high volume methods.

Accordingly it is an object of the present invention to provide a drive connection to a movable flange which will fix the flange radially to a shaft while allowing the flange to move axially without the use of ball splines or other joining methods which require costly machining.

It is another object of the present invention to provide increased structural rigidity to the servo mechanism used to axially move the flange along the shaft.

Other objects, advantages and features of this invention will become apparent on reading the following description and appended claims, and upon reference to the accompanying drawings.

SUMMARY OF THE INVENTION

According to one aspect of the present invention there is provided a CVT which utilizes a pair of adjustable pulleys: a primary pulley connected to an engine and a secondary pulley connected to a drive train. A belt connects the pulleys and thus transmits power from the engine to the drive train. A slippable start clutch is positioned upstream of the primary pulley. A non-dynamic clutch system, comprising one or two non-dynamic clutches, is connected downstream of the secondary pulley. The non-dynamic clutch system has a predetermined clutch capacity set at a level exceeding the torque capacity of the engine driving the power train, but less than the torque capacity of the belt system. Further details of such a CVT are provided by Neuman, U.S. Pat. No. 5,006,092, referred to above and incorporated by reference.

Each pulley is adjustable and is constructed from a pair of sheaves or flanges; one flange being fixed to a shaft while the other is mounted so as to be axially movable along the shaft. The flanges define a V-shaped groove into which the belt fits. The inner face of the flanges are bevelled or chamfered, so that as an axially movable flange moves relative to the fixed flange, the effective pulley diameter may be adjusted.

The movable sheave is supported by a close tolerance fit with the shaft. This fit supports the movable flange radially, however, permits it to move axially relative to the shaft.

A radial drive connection between the movable flange and shaft is provided through a radial support structure. Specifically, the radial drive connection is provided through a rigid disc splined to the shaft. The disc has an annular extension extending therefrom. Spanning between the disc and the end of the annular extension is a guide. Although any number of guides may be provided about the shaft, in the preferred embodiment three guides equally spaced about the shaft are used. The exact number used and location may vary according to the torque to be transmitted. Each guide is comprised from a bolt or pin and a sleeve. The movable flange is configured to have a foot. An annular wall is splined to the foot. A bore hole in the annular wall slidably engages the guide to thereby provide a radial drive connection and allow axial movement of the movable flange. In addition, through such an arrangement, the annular wall and the end of the annular extension effectively cooperate as a truss, thereby increasing the structural rigidity of the servo mechanism. Because the wall and guide slide relative to one another, however, the movable flange is permitted to move axially along the shaft.

For a better understanding of these and other objects and aspects of the invention, reference should be made to the following detailed description taken in conjunction with the accompanying drawings.

BRIEF DESCRIPTION OF THE DRAWINGS

FIGS. 3 and 4 are perspective illustrations of a variable pulley transmission or CVT system shown in a first and in a second drive ratio.

FIG. 7 is a cross-sectional view of a variable pulley transmission or CVT system in a second embodiment constructed according to the invention and configured in the first drive ratio.

FIG. 8 is a cross-sectional view of a variable pulley transmission or CVT system in a second embodiment constructed according to the invention and configured in the second drive ratio.

FIG. 9 is a cross-sectional view of the embodiment shown in FIG. 7 taken along line 9—9 of FIG. 7.

DETAILED DESCRIPTION OF THE DRAWINGS

Figure 1:
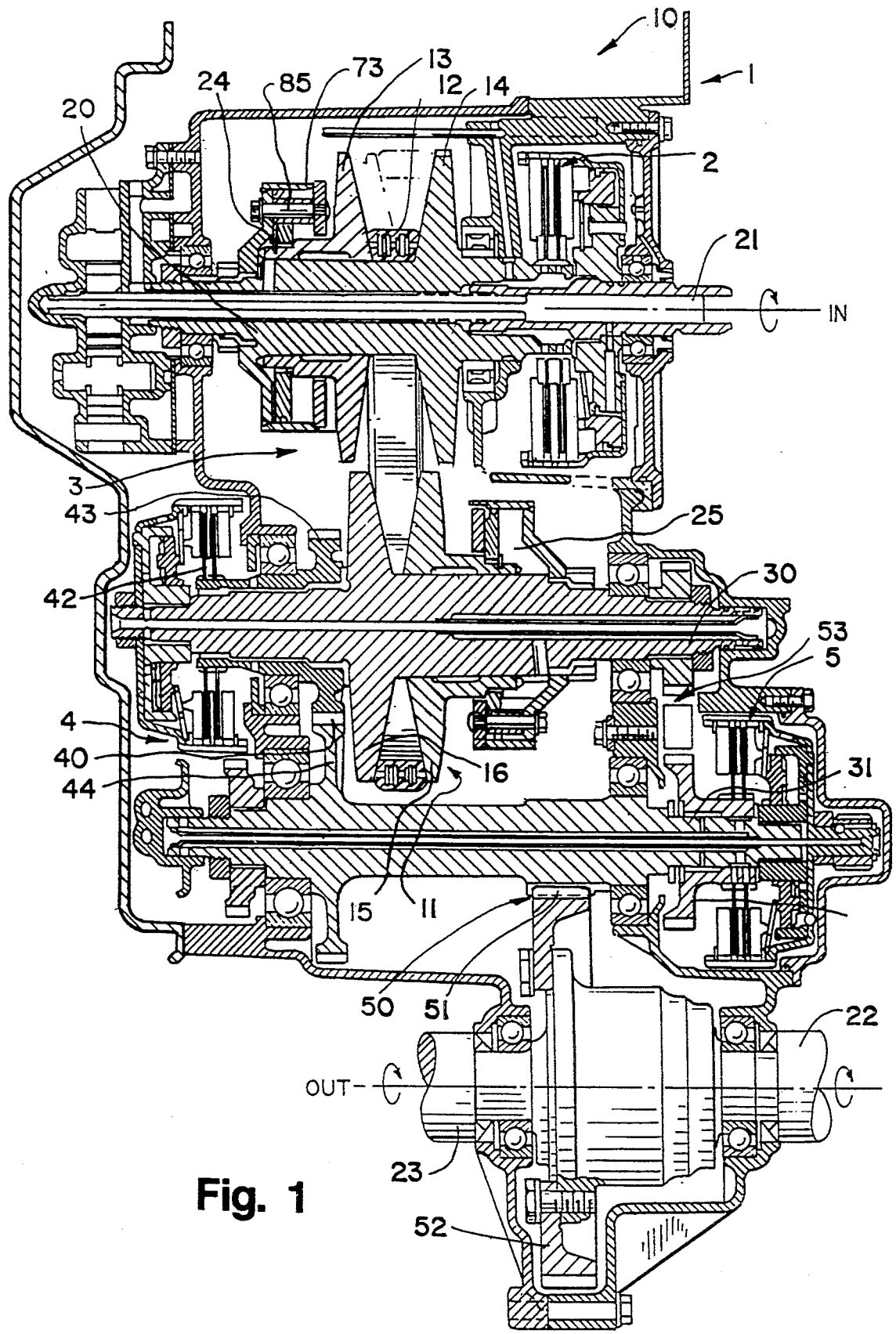
FIG. 1 is a cross-sectional view of a CVT system according to the invention.
Figure 2:
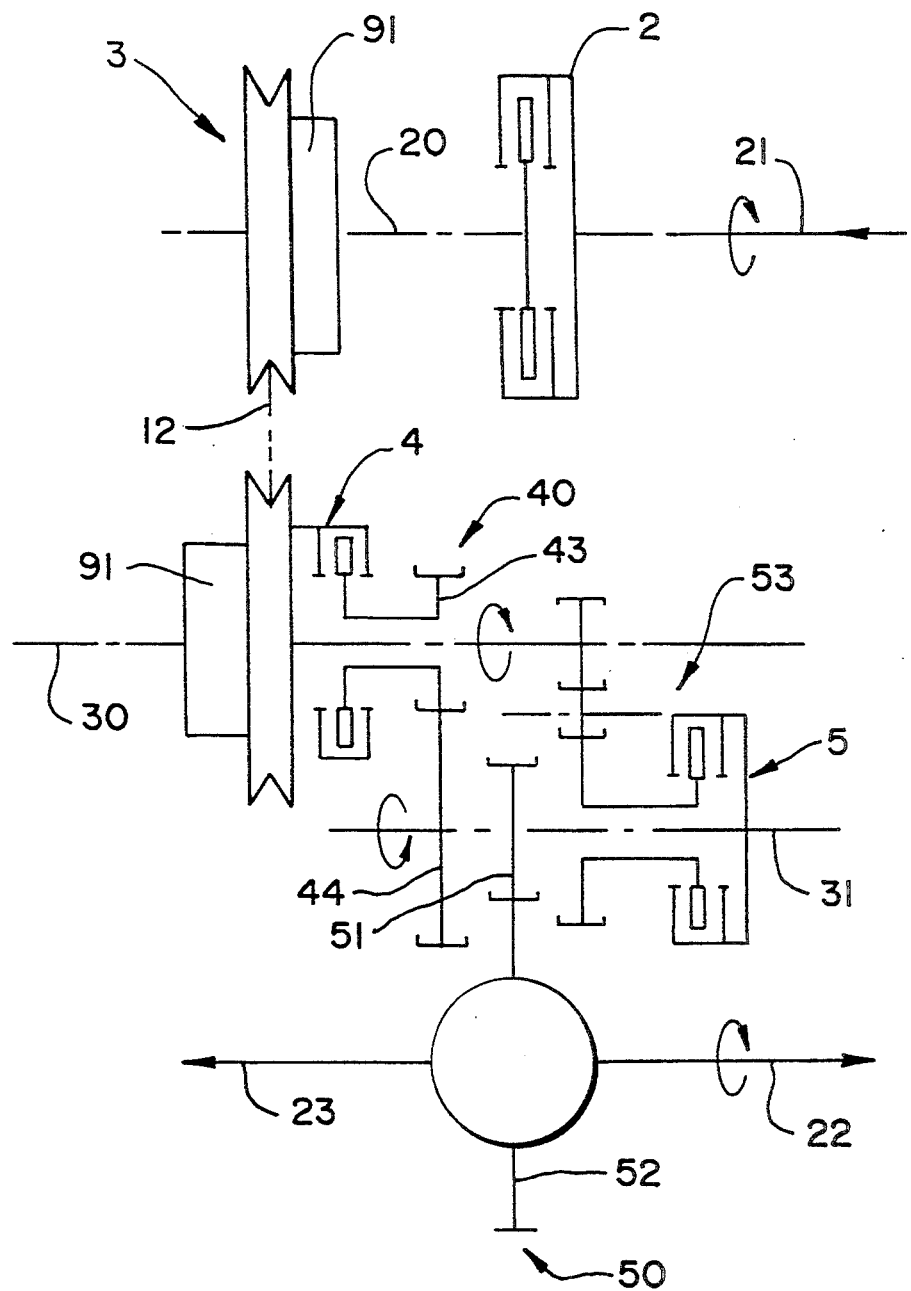
FIG. 2 is a schematic representation of a CVT system according to the invention.

Turning to FIGS. 1 and 2 a CVT generally designated 1 is shown. FIG. 2 is a schematic representation illustrating the general features of the CVT of FIG. 1. While FIG. 1 is a detailed depiction of the transmission system, the operation of the system can be more fully understood by reference to Algrain et al. U.S. Pat. No. 5,031,481 entitled "Electro-Hydraulic Control System For A Dual-Pass Continuously Variable Transmission" herein incorporated by reference, as well as U.S. Pat. Nos. 5,006,092 and 4,433,594 referred to above and also herein incorporated by reference. A slippable start clutch 2 is located upstream of a belt and flange system, shown generally as 3, and non-dynamic forward and reverse clutches 4, 5 are situated downstream of the belt and flange system 3. The belt and flange system 3, described in more detail below, includes first and second adjustable pulleys 10, 11 and an endless belt 12 connecting the pulleys. The first adjustable pulley 10 is made up of flanges 13 and 14. The second adjustable pulley 11 is made up of flanges 15 and 16. Flanges 13 and 14 of the first adjustable pulley 10 are mounted to shaft 20 which receives torque from the engine (not shown) to the transmission. Output shafts 22 and 23 output torque from the transmission to the drive train (not shown.) Flanges 15 and 16 of the second adjustable pulley 11 are mounted to the first intermediate shaft 30. The first and second pulleys 10 and 11 are coupled by a flexible endless belt 12. The belt 12 can be of metal or elastomeric construction, as known in the art. A first servo chamber 24, receives fluid to move the first movable flange 13 and a second servo chamber 25 receives fluid to move the second movable flange 15.

A start clutch 2, connected to engine shaft 21, transmits torque from the engine (not shown) to shaft 20. The start clutch 2 is a slippable clutch which is fluid actuated, i.e., the pressure of fluid applied controls the amount by which the start clutch 2 slips. A controlled minimum clutch slippage during operation can be used to reduce the transmission of torsional vibrations from the engine (not shown) to the belt and flange system 3 of the CVT.

A non-dynamic forward clutch 4 is disposed on the first intermediate shaft 30 and a non-dynamic reverse clutch 5 is disposed on a second intermediate shaft 31. The second intermediate shaft 31 is coupled to the output shafts 22, 23.

The forward and the reverse clutches 4, 5 are non-dynamic and therefore operate in one of two conditions, a first or locked condition, or a second or unlocked condition. The forward and reverse clutches 4, 5 are hydraulically actuated between the first and second conditions in response to the position of a gear lever (not shown.) Engagement of the forward clutch 4 causes, though a series of gear members, the output shafts 22, 23 to rotate in a first direction for forward movement of the vehicle. Engagement of the reverse clutch 5 causes, through a series of gear members, the output shafts 22, 23 to rotate in a second direction opposite to the first direction for reverse movement of the vehicle. The forward and the reverse clutches 4, 5 are not engaged at the same time, as this results in the system being locked, preventing rotation of the output shafts in either direction. Both clutches are released when the transmission is in the neutral or parked condition. Further details of the operation of these clutches are provided by Neuman et al., U.S. Pat. No. 5,006,092, referred to above and incorporated by reference.

A forward gearing system 40 is coupled for rotation with the movable clutch plate 42 of the forward clutch 4. The system is driven by the CVT when the forward clutch 4 is engaged to couple the first intermediate shaft 30 to the second intermediate shaft 31. When the forward clutch 4 is released, no torque is transmitted to the second intermediate shaft 31. The forward gearing system 40 includes a drive gear 43 connected to the clutch plate 42 and a driven gear 44 disposed for rotation with the second intermediate shaft 31.

The second intermediate shaft 31 is coupled to the output shafts 22, 23 through an output gear system 50 that includes a drive gear 51 and a driven gear 52. With the output gear system 50 as illustrated, the output shafts 22, 23 rotate in the same direction as the first intermediate shaft 30 to drive the vehicle in the forward direction when the forward clutch 4 is engaged. The gearing system could, however, take an alternative arrangement and cause the output shafts 22, 23 to rotate in the opposite direction of the second intermediate shaft 31 provided that the output shafts 22, 23 rotate in the forward direction for forward motion and the reverse direction for reverse motion.

A reverse gearing system, shown generally as 53 and more fully disclosed in Neuman et al. U.S. Pat. No. 5,006,092 discussed above, is further provided to enable the drive train to be driven in reverse through the use of the adjustable pulleys 10, 11 in the CVT.

FIGS. 3 and 4 of the drawings illustrate schematically how a CVT achieves multiple drive ratios, including the various underdrive and overdrive ratios. The first adjustable pulley 10 is connected to shaft 20 and a second adjustable pulley 11 is connected to shaft 30. Belt 12 interconnects pulleys 10, 11. Pulley 10 comprises generally conical flanges 13 and 14 while pulley 11 comprises generally conical flanges 15 and 16. In order to change the drive ratio between the pulleys and the shafts, flange 13 of pulley 10 is axially movable with respect to flange 14, and correspondingly, flange 15 of pulley 11 is axially movable with respect to flange 16. It is understood that both flanges of a pulley may be axially movable with respect to each other, but generally this is not necessary to effect the changes in the drive ratios between the pulleys and their respective shafts. Various types of controls may be used to effect the changes in drive ratio but these are not within the purview of this invention. As can be readily understood, the side surfaces or edges of the belt 12 frictionally engage the pulley flanges when transmitting torque from the drive pulley to the driven pulley. In CVTs, at least one of the flanges of each pulley is conical; in many, as shown herein, both flanges are conical.

Figure 5:
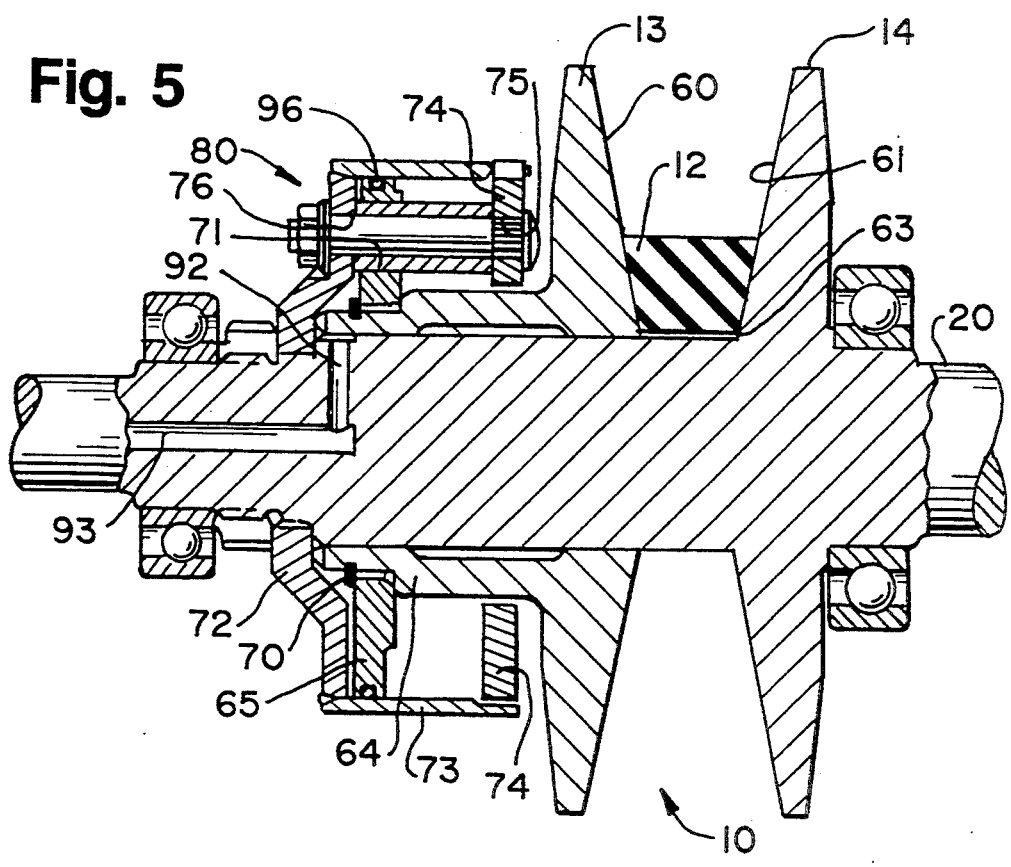
FIG. 5 is a cross-sectional view of a variable pulley transmission or CVT system in a first embodiment constructed according to the invention and configured in the first drive ratio.

A CVT pulley, constructed according to the present invention is illustrated in detail in FIG. 5 and is identified with the reference character 10. It is understood that, as described above, a CVT comprises a pair of pulleys, one of which may be lesser in diameter than the other but substantially of the same construction. Therefore, only one pulley need be described in detail. The pulley 10 comprises a pair of generally conical flanges 13 and 14 with surfaces 60 and 61 defining a generally V-shaped space therebetween. Pulley flange 14 is integral with shaft 20 so as to be rotatable therewith. The shaft 20 is connected via the start clutch 5 (not shown in this illustration but described above) to input shaft 21 which in turn is connected to an engine (not shown.)

The CVT pulley 10 shown in FIG. 5 is in a first drive ratio where the flanges 13 and 14 are spaced apart and the belt 12 is engaged at a inner radius 63 of the pulley 10. The movable flange 13 conical surface 60 engages the belt 12 at a point opposite the fixed flange 14 conical surface 61. The movable flange 13 has a foot 64 which slides along the shaft 20 to achieve a variable pulley function. An annular wall 65 is splined to or otherwise radially secured to the foot 64 of the movable flange 13 and located axially by a retaining ring 70. The annular wall 65 has a plurality of bore holes 71 through which the guides 80 slidably engage. Preferably a clearance between annular wall 65 and extension 73 is such that they only communicate through seals 96. In accordance with this preferred design, seals 96, and annular wall 65, provide no structural support for foot 64 and flange 13.

The movable flange 13 is drivingly connected through an annular disc 72 splined or otherwise radially secured to the shaft 20. Fixed to the annular disc 72, in turn, is an extension 73. The extension 73 interconnects with inner ring 74. Both the inner ring 74 and the annular disc 72 have corresponding bore holes 75, 76. Fitted and secured through bore hole 76 of the annular disc 72 of the shaft 20 and the bore hole 75 of the inner ring 74 is the guide 80. The guide 80 is constructed from a sleeve 81 positioned between the surface 82 of the disc and the surface 83 of the inner ring 74 by a fastener 84. The fastener 84 is a bolt 85 secured by a self-locking flanged nut 86. The sleeve 81 engages the inner surface of the bore hole 71 of the annular wall 65 of the movable flange 13 to thereby provide a radial drive connection between movable flange 13 and shaft 20 while permitting axial movement. Through such an arrangement, the annular disc 72 and inner ring 74 effectively cooperate as a truss, thereby increasing the structural rigidity of the servo mechanism. The exact number of guides 80 utilized to provide such a connection may vary and is dependent, in part, upon the torque load. In the preferred embodiments three guides equally spaced about the shaft 20 are used as seen in FIG. 9.

Figure 6:
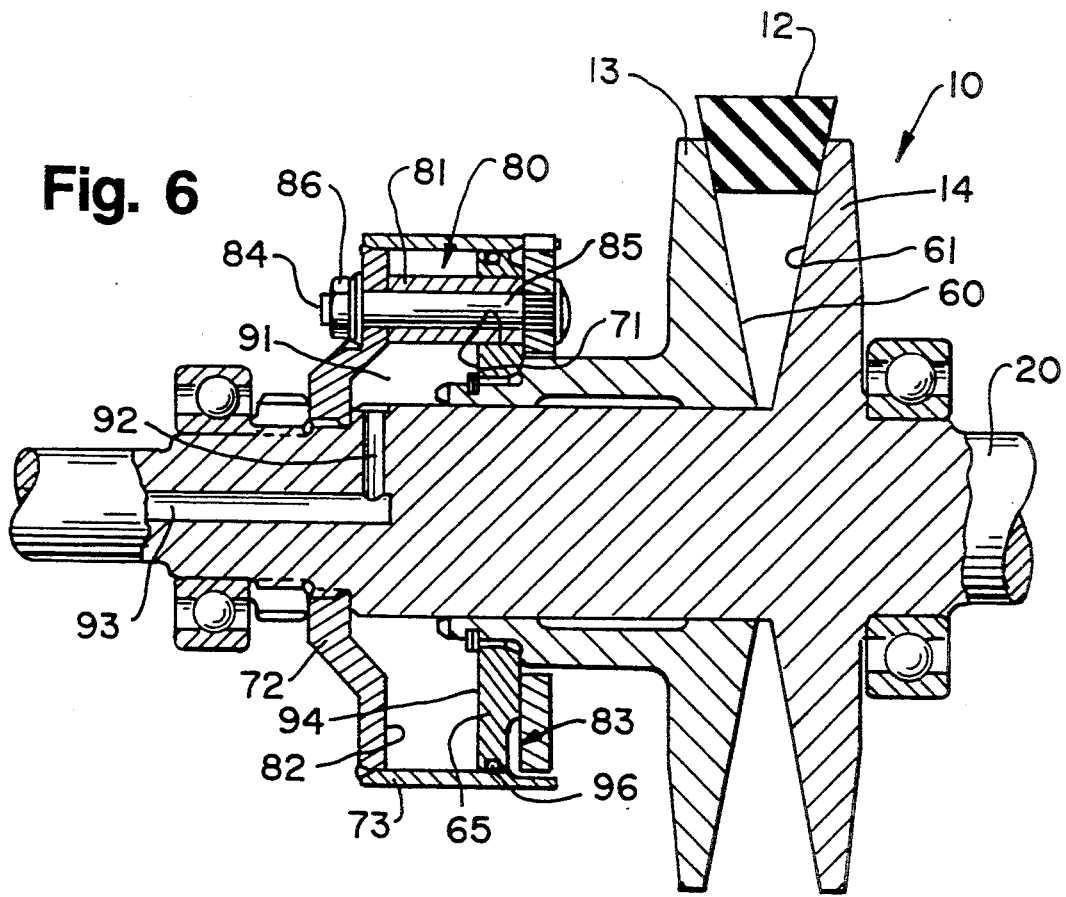
FIG. 6 is a cross-sectional view of a variable pulley transmission or CVT system in a first embodiment constructed according to the invention and configured in the second drive ratio.

The movable flange 13 is axially moved through hydraulics. As seen in a comparison of FIGS. 5 and 6 a piston 91 is formed by the annular wall 65, the drive shaft disc 72, the extension 73 and the shaft 20. Hydraulic port 92 through bore 93 allows the piston 91 to communicate to a reservoir (not shown.) The hydraulic integrity of piston 91 is achieved through seals 96. The piston 91 moves the movable flange 13 through the increase in pressure in the piston 91. As seen, increasing the pressure in the piston 91 presses on the surface 94 of the wall 65 of the movable flange 13. Upon sufficient pressure the force exerted by the belt 12 on the movable flange 13 is overcome and the movable flange 13 is moved towards the fixed flange 14, as seen by comparing FIGS. 5 and 6. Movement of the movable flange 13 in the opposite direction, i.e., away from the fixed flange 14, occurs through the force belt 12, under tension, exerts on the side surfaces 60, 61 of the flanges 13, 14.

Another preferred embodiment of the present invention can be seen in FIGS. 7 and 8. All aspects of this design are the same as that previously discussed with the exception that extension 73 is fixed to inner ring 74 and the addition of an annular extension 100 on the movable flange 13. Through extension 100 an additional hydraulic piston 101 is formed, seen to be bounded by the movable flange surfaces 95 and 99 the inner ring 74 of the annular disc extension 72 and the extension 100. Hydraulic port 102 through bore 93 allows the piston 101 to communicate to a reservoir (not shown.) The piston 101 cooperates with piston 91 to move the movable flange 13 through the increase in pressure in the pistons. As mentioned above, through such an arrangement, the annular disc 72 and inner ring 74 effectively cooperate as a truss, thereby increasing the structural rigidity of the servo mechanism. Sealing elements may further be provided in bore hole 71 of annular wall 65 to minimize fluid leakage through the slidable fit between annular wall 65 and sleeve 81. Similar to the previous embodiment, flange 13 is not supported by ring 74, extension 73, or annular wall 65.

The above are two of the preferred embodiments of the present invention as contemplated. Various changes and modifications may be made by those skilled in the art without departing from the spirit of the invention.

What is claimed is:

1. A continuously variable transmission system to provide transmission of torque from a power input to a power output, comprising:
   an input shaft disposed for operative connection to a power input;
   an output shaft disposed for operative connection to a power output;
   a continuously variable drive system having a first adjustable pulley mounted to a first shaft, the first adjustable pulley comprising a first flange fixed to the first shaft, a first disc fixed to the first shaft, the first disc having a first extension extending from the first disc in a first direction, a guide disposed substantially normal to the first disc and parallel with the first extension, a second flange, the second flange mounted around the first shaft between the first flange and the first extension, the second flange capable of axial movement along the first shaft, the second flange having a foot parallel to the first shaft with the foot having a wall extending normal to and away from the first shaft and further having a bore to slidably receive the guide to provide a radial drive connection between the second flange and the first shaft and allowing axial movement of the second flange, a second pulley mounted on the output shaft and a belt interconnecting the first adjustable pulley and the second pulley; and
   a clutch system to selectively connect the continuously variable drive system with the output shaft.

2. The continuously variable transmission system of claim 1 wherein the clutch system includes a first non-dynamic clutch and a second non-dynamic clutch.

3. The continuously variable transmission system of claim 1 wherein the guide comprises a pin having an annular sleeve.

4. The continuously variable transmission system of claim 1 wherein the guide extends in a plane substantially parallel to the first shaft.

5. The continuously variable transmission system of claim 1 further comprising a first piston bounded by the first disc, the wall, the extension and the first shaft.

6. The continuously variable transmission system of claim 1 further comprising a hydraulic port communicating with the first piston and a reservoir, the hydraulic port allowing for the introduction of a hydraulic fluid from the reservoir into the first piston to permit axial movement of the second flange.

7. The transmission system of claim 1 wherein the wall communicates with the extension through a seal.

8. The transmission system of claim 7 wherein the wall is axially located by a retaining ring.

9. The continuously variable transmission system of claim 1 wherein the first extension extends towards the second flange.

10. An adjustable pulley for use in a continuously variable transmission comprising:
    a shaft;
    a first disc fixed to the shaft, the first disc having a first extension extending from the first disc in a first direction;
    a first flange fixed to the shaft;
    a guide disposed substantially normal to the first disc and parallel with the first extension; and
    a second flange, the second flange mounted around the shaft between the first flange and the first extension, the second flange capable of axial movement along the shaft, the second flange having a foot parallel to the shaft with the foot having a wall extending normal to and away from the shaft and further having a bore to slidably receive the guide to provide a radial drive connection between the second flange and the shaft and allowing axial movement of the second flange.

11. The adjustable pulley of claim 10 wherein the guide comprises a pin having an annular sleeve.

12. The adjustable pulley of claim 10 wherein the guide extends parallel to the shaft.

13. The adjustable pulley of claim 10 further comprising a first piston bounded by the first disc, the wall, the extension and the shaft.

14. The adjustable pulley of claim 10 further comprising a hydraulic port communicating with the first piston and a reservoir, the hydraulic port allowing for the introduction of a hydraulic fluid from the reservoir into the first piston and thereby axially move the second flange.

15. The pulley of claim 10 wherein the wall is mounted around the foot.

16. The pulley of claim 15 wherein the wall is axially located by a retaining ring.

17. The adjustable pulley of claim 10 wherein the first extension extends towards the second flange.

18. The pulley of claim 10 wherein the wall communicates with the extension through a seal.

19. The transmission system of claim 1 wherein the wall is mounted around the foot.

* * * * *